United States Patent

[11] 3,611,054

| [72] | Inventors | John Piper;<br>Roger J. Raschiotto, both of Greenville, S.C. |
|---|---|---|
| [21] | Appl. No. | 15,410 |
| [22] | Filed | Mar. 2, 1970 |
| [45] | Patented | Oct. 5, 1971 |
| [73] | Assignee | Union Carbide Corporation<br>New York, N.Y. |

[54] HERMETICALLY SEALED SOLID ELECTROLYTIC CAPACITOR
10 Claims, 6 Drawing Figs.

[52] U.S. Cl. .................................... 317/230, 29/570
[51] Int. Cl. .................................... H01g 9/05
[50] Field of Search ........................... 317/230, 231, 232, 233

[56] References Cited
UNITED STATES PATENTS

| 2,776,467 | 1/1957 | Brennan ..................... | 317/230 X |
| 3,036,249 | 5/1962 | Hall ............................ | 317/230 |
| 3,181,227 | 5/1965 | Grainger et al. ............. | 29/25.42 |
| 3,316,463 | 4/1967 | Comado et al. .............. | 317/230 |
| 3,439,231 | 4/1969 | Booe ........................... | 317/230 |
| 3,475,658 | 10/1969 | Howard et al. .............. | 317/230 |
| 3,538,395 | 11/1970 | Riley .......................... | 317/230 |

*Primary Examiner*—James D. Kallam
*Attorneys*—Paul A. Rose, Harrie M. Humphreys and Robert C. Cummings ABSTRACT: The fabrication of hermetically sealed, solid electrolytic capacitors by first forming a high-temperature hermetic seal between a metallized ceramic header and a metal sleeve, and then inserting a solid electrolytic capacitor having a first lead wire welded to the capacitors anode lead in the sleeve with the nickel lead wire extending through a metallized opening in the header, solder sealing the other end of the metal sleeve, bonding the first nickel wire to the header as an anode lead and bonding a second nickel wire to the header as a cathode lead.

INVENTORS
JOHN PIPER
ROGER J. RASCHIOTTO

PATENTED OCT 5 1971

INVENTORS
JOHN PIPER
ROGER J RASCHIOTTO
BY
Leo A. Plumb jr.
ATTORNEY

HERMETICALLY SEALED SOLID ELECTROLYTIC CAPACITOR

This invention relates to the production of solid electrolytic capacitors having high-volumetric efficiency in a hermetically sealed metal and ceramic case.

Tantalum solid electrolytic capacitors, as described in U.S. Pat. No. 3,166,693, have gained wide acceptance in the electronics industry because of their excellent performance characteristics and particularly because of the high capacitance-voltage per unit of volume of such devices. This type capacitor comprises: a porous anode body formed of sintered particles of an anodizable metal, generally tantalum, and having a tantalum lead wire embedded in the body or welded thereto; a dielectric oxide film formed on the exposed surfaces of the metal particles; a solid electrolyte layer of manganese dioxide covering the dielectric oxide film in the pores and on the surfaces of said particles; and a conductive coating or coatings over the manganese dioxide, these coatings generally including a graphite layer and an outer metallized layer over the graphite. Electrical contact is made to the cathode of the capacitor through the metallized graphite coatings on the porous body, for example, by soldering a lead wire or metal case to the so-coated body. The tantalum wire extending from the porous body is the anode lead, but because of the nonsolderability of tantalum, a solderable metal wire, generally of nickel, is first welded to the tantalum wire before the device is encapsulated or incorporated into a circuit structure.

The high-volumetric efficiency of the unencapsulated solid electrolytic capacitor as described above is of course lessened when the device is packaged offered gain protection from environmental conditions, e.g. changes in temperature and humidity, exposure to other gases and liquids, and from mechanical stress. Generally as the degree of environmental protection offered increases due to the use of a particular type of packaging system, the volumetric efficiency of the finished packaged unit decreases. For example, while the packaging of the capacitor in a shrunk-fit plastic sleeve backfilled with a molding compound provides a product having quite high volumetric efficiency, the degree of environmental protection offered by such a packaging system is obviously not sufficient for many of the more stringent applications. The encapsulation of the capacitors with molding material to provide integrally sealed plastic units having only the external lead wires extending therefrom provides a somewhat higher degree of environmental protection but in a larger case size. The protection is not complete however since moisture often leaks into such units along the lead wires. Such molded units are excellent for many intended uses of solid electrolytic capacitors, but the more stringent conditions of military and industrial use require still greater integrity in the packaging system.

The highest degree of environmental protection is afforded to these capacitors through their encapsulation in hermetically sealed metal-ceramic or metal-glass containers. To prepare a typical hermetrically capacitor, the anode body is placed in a cup-shaped can which has a pellet of solder therein, heating the can to melt the solder around the anode body and seal it to the can interior, thereby making electrical contact to the cathode of the capacitor, and then placing a glass disc having a metal rim and a metal eyelet over the mouth of the can with the anode lead wire projecting through the metal eyelet. The eyelet is solder-sealed to the anode wire and the disc is soldered around its rim to the metal can to complete the hermetic sealing. A properly sealed capacitor of this type can withstand a considerable variation in temperature and other environmental conditions and many such capacitors are now performing excellently in space satellites. However the production on a commercial basis of the leakproof hermetic seals of his type is difficult. Since the capacitor anode is heat sensitive, the production of peripheral seal between the rim of the glass disc and the metal can must be done under carefully controlled temperature conditions, preferably at lower temperatures and using soft lead-tin solders. Even so the anodes are often damaged. Additionally these seals cannot conveniently be tested for gastightness, at least not until the capacitor package is completed.

Additionally the volumetric efficiency of hermetically sealed capacitors is considerably reduced, generally about one-fifth or less of the unencapsulated capacitor. This is due to the increased size of the package consisting o the cup-shaped metal can package with its solder filling, but a significant part of the increase in size and decrease in volumetric efficiency is due to the need to provide room in the metal case for the welded connection of a nickel lead wire to the tantalum anode lead of the capacitor. This connection is generally made inside the case since the tantalum lead cannot be soldered to the metal eyelet in the glass disc as can the nickel lead wire. While the tantalum lead wire could be arranged to extend directly through a metallized hole in a ceramic header, rather than a glass eyelet, and a brazed connection made between the tantalum wire and the metallized ceramic, this means that a nickel lead wire will have to be welded to the tantalum wire at some point exterior to the case, thereby increasing the overall length of the external leads. While the case size may have been decreased because of the lack of an interior weld connection, the effective size of the unit is about the same since the space on a circuit structure which the unit would occupy would include the unusable portion of the tantalum lead projecting from the case. It is therefor generally desired to have only a nickel lead wire projecting from the case so that a soldered connection of the capacitor into a circuit structure can be made as close to the capacitor case as desired. This is particularly important in regard to radially leaded hermetically sealed capacitors which are to be inserted in the holes of printed circuit boards.

The difficulties described above in regard to providing hermetic sealing in an efficient use of packaging space are multiplied when applied to the fabrication of miniature tantalum capacitors, e.g., those having a case size of only 0.475 by 0.375 by 0.150 inches. There is a considerable interest in solid electrolytic capacitors in hermetically sealed cases of this size as well as even smaller sizes for use in microminiature hybrid circuit modules. It is extremely difficult, however, to scale down the materials and production operations, particularly the lead-wire-welding operation, to allow the commercial fabrication of such small units in a hermetically sealed case.

It is the object of this convention therefore to provide a process for producing hermetically sealed solid electrolytic capacitors in a package system having a high-volumetric efficiency.

It is also an object of this invention to produce a process for producing hermetically sealed solid electrolytic capacitors in a microminiature case.

It is another object of this invention to provide a process for fabricating hermetically sealed solid electrolytic capacitors having superior seals having a higher degree of reliability.

It is a further object of this invention to provide a process for fabricating hermetically sealed solid electrolytic capacitors using production operations requiring less exacting manual processing without sacrifice of the components reliability.

It is another object of this invention to provide improved hermetically sealed solid electrolytic capacitors.

In accordance with these objects an invention is provided for fabricating hermetically sealed solid electrolytic capacitors comprising:

a. providing an open-ended metal sleeve and an insulative header having a metallized portion around its periphery and at least one metallized lead wire opening therethrough, and forming a hermetically sealed connection between said header and one end of the metal sleeve at the outer metallized periphery of said header;

b. providing a processed unencapsulated solid electrolytic capacitor having a porous body of pressed and sintered particles of an anodizable metal with an anode lead wire of the same anodizable metal extending therefrom, said body having a dielectric oxide film over its surfaces, a solid electrolyte layer thereover, a graphite and metallized layer over the electrolyte, and welding a length of a solderable metal wire to the anode lead wire at a point thereon proximate but spaced apart from the capacitor body;

3,611,054 c. positioning the capacitor body in said sleeve with the free end of the solderable metal wire passing through the metallized opening in the header;

d. solder sealing the open end of the sleeve to secure the capacitor body in place and to provide a cathode connection thereto.

e. forming a hermetically sealed connection between the solderable metal wire and the metallized opening in the header. The order of the making of the seal of this step and step (d) may be reversed as desired.

In order to complete the radially leaded device a (2) lead is connected to the header with provision made for an electrical connection to the metallized surface of the capacitor. Several procedures can be used, as follows: (1) the header is provided with a second metallized cathode lead wire opening therethrough insulated from the first anode lead wire opening, and a solderable metal cathode lead is soldered at one end to the metallized surface of the capacitor body, and the other end of said cathode lead wire is passed through the sealed connection is made between the cathode lead wire and its metallized opening; or (2) a metallized portion is formed on the upper or lower surface of the header extending to the peripheral metallization on said header, and an external cathode lead wire is connected to said metallized portion to make electrical contact with the metal sleeve and the capacitor body soldered therein, as by having the end face of the cathode lead connected to the metallized portion when it is formed on the upper surface of the header, or by having the cathode lead extend through a metallized opening in the header when said metallized surface portion is formed on the lower surface of the header and extends to said metallized opening.

In order to form a radially leaded device as described above wherein the leads are to be each offset from the center of the header, and wherein the anode lead extends from the center of the capacitor body, the solderable metal wire to be welded to said anode lead in step (b) is first formed with an L-shaped leg at its end and welded crosswise to the anode lead at a point on the leg equal to the spacing between the anode lead and the metallized anode lead wire opening in the header, whereby when the solderable metal lead wire is drawn through the off-centered metallized opening in the header the capacitor body will be positioned with its anode lead along the center line of the metal sleeve.

DESCRIPTION OF THE PREFERRED EMBODIMENTS

Figure 1:
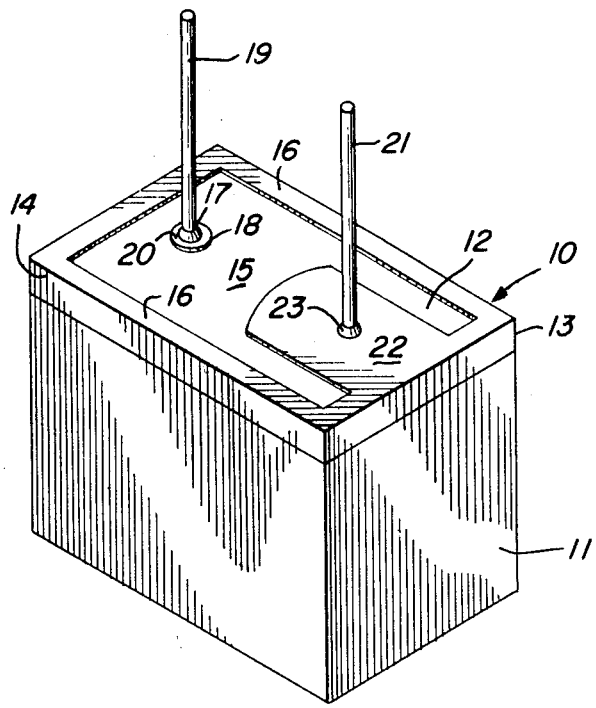
FIG. 1 is a perspective schematic view of one embodiment of a hermetically sealed solid electrolytic capacitor made according to the process of this invention.

Referring to FIG. 1 there is shown a radially leaded hermetically sealed solid electrolytic capacitor of this invention. The capacitor is sealed in the case 10 made up of a metal sleeve 11 to which has been bonded a ceramic header 12. The underside (not visible in FIG. 1) of the metal sleeve 11 has been sealed with solder.

The ceramic header 12 has a metallized peripheral portion 13 which extends around the sides 14 of the header and overlaps the upper surface 15 of the header in a narrow strip 16 and also overlaps the underside of the header in another narrow strip (not visible in FIG. 1). The header has been bonded to the top of the sleeve by high-temperature soldering, brazing or any other high-reliability metal-joining operation since this sealing of the header to the metal sleeve is performed before the heat-sensitive capacitor body is inserted into the sleeve, as will be explained hereinafter. The ceramic header was provided with hole or opening at 17, the internal sides of which were metallized and with a metallized edge portion 18 surrounding the opening on the upper surface 15 of the header. A solderable metal wire 19, for example a solder-coated nickel wire, emerges through the opening 17 from the interior of the case where it was welded to the anode lead of the capacitor body before that body was passed into the sleeve. The lead wire 19 is sealed in the opening 17 by soldering, with a solder fillet 20 shown built up between the wire and metallized rim 18 around the opening. The length of nickel wire 19 projecting from the case 10 is insulated from the metallized edge portions 16 on the header by the surrounding ceramic portions 15 of the header 13 and so is insulated from the sleeve 11 as well. This wire 19 serves as the anode lead of the device.

A cathode lead wire 21, which also can be nickel, projects from another metallized portion 22 on the upper surface 15 of the header. The wire 21 in this instance does not extend through any opening in the header, but is soldered to metallized portion 22 with a solder fillet 23 shown. While the wire 21 does not extend into the case to contact the capacitor body to make a cathode connection, this wire 21 is electrically in contact with the capacitor body through a low-resistance electrical path formed by the metallized portion 22, metal sleeve 11 bonded thereto, the capacitor body having been soldered in electrical contact to the interior of the sleeve 11.

Figure 2:
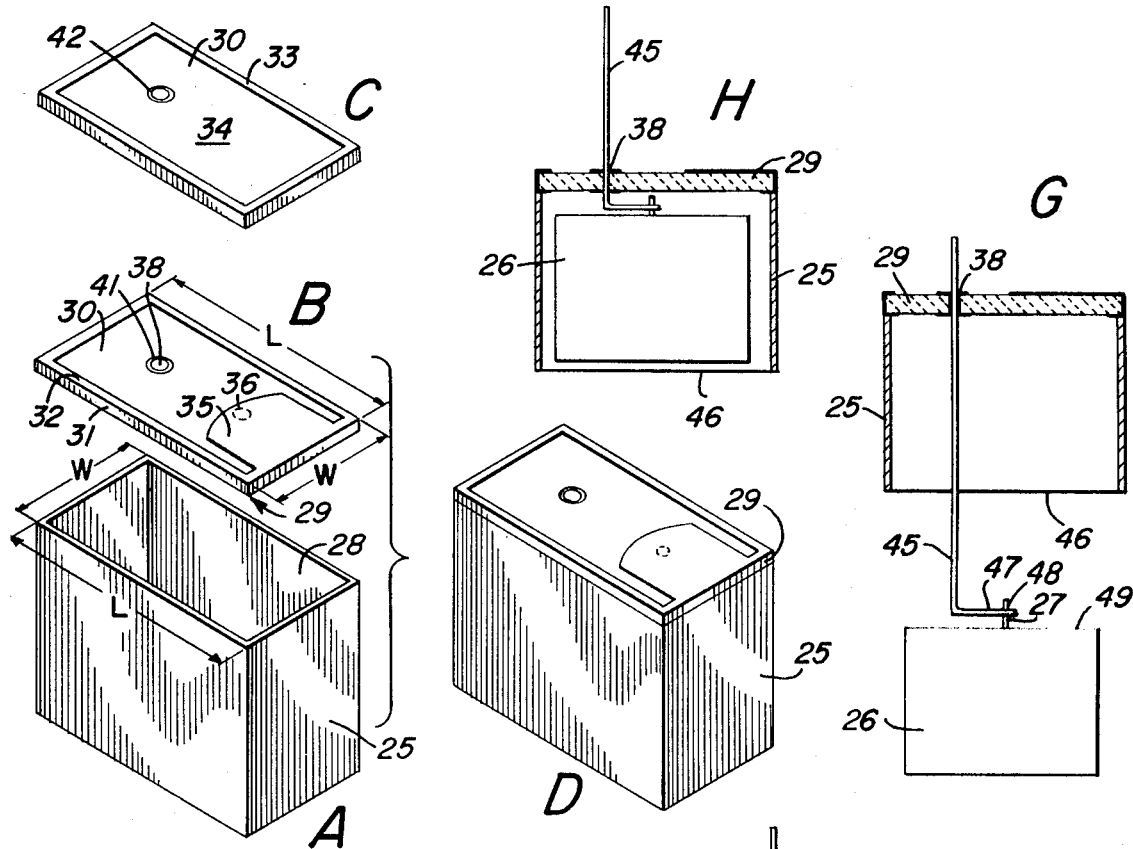
FIGS. 2 A to K are a series of schematic perspective and sectional views showing the steps in fabricating a hermetically sealed solid electrolytic capacitor of FIG. 1 according to this invention.
Figure 2:
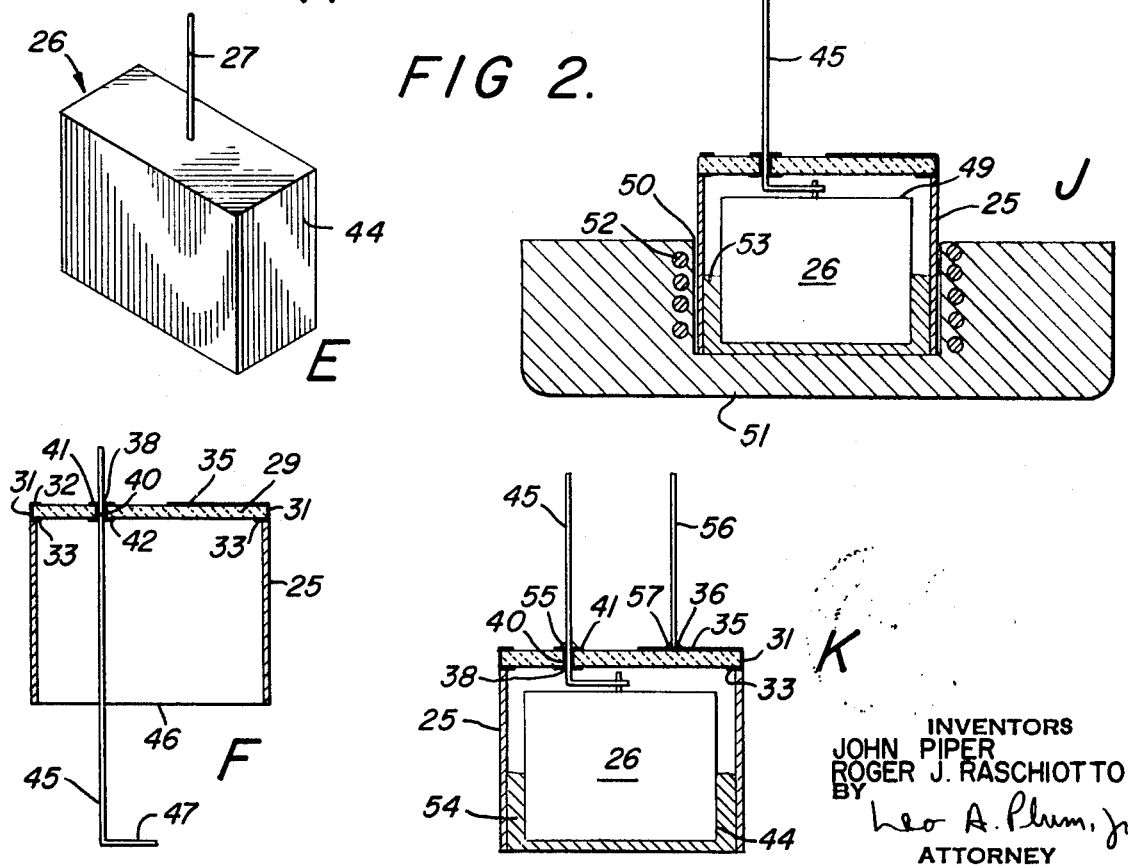

Referring to FIG. 2 a series of schematic views A to K show the steps involved in the fabrication of a radially leaded hermetically sealed capacitor of the type shown in FIG. 1. FIG. 2-A shows an open-ended tube or sleeve 25 made of light gage metal, e.g. brass provided with a silver and then a solder coating. This sleeve will form the main section of the hermetically sealed case for holding the capacitor. The sleeve shown has a rectangular cross section since the capacitor body 26 of FIG. 2-E in this case is a rectangular slab type anode body. The sleeve 25 could have a round cross section if the capacitor anode were of the cylindrical or pellet type. The dimensions of the sleeve "W" and "L" are such as to allow a small space around the anode body 26 for the presence of a subsequently applied solder filling which will bond the capacitor body in the sleeve. The height of the sleeve is determined by such factors as the height of the anode, the need to have a bottom sealing of the se under the anode, and the need to provide room for the welded connection of a solderable metal lead wire extension to the anode lead 27. By use of the fabrication procedures of the present invention it is possible to minimize the dimensions of the sleeve when desired, particularly in regard to the amount of space required for the welded anode lead connection, as will be explained further below.

The top opening 28 of sleeve 25 is closed by means of header 29. The header 29 in this case has dimensions "W" and "L" matching those of the sleeve and so rests on top of the sleeve in an abutting relationship as shown in FIG. 2-D The header 29 is made up of a heat-resistant insulative body; which in this case is a plate of ceramic material 30, e.g., a pressed and sintered alumina-type ceramic material. The peripheral portions of the ceramic slab are metallized, i.e. provided with a sintered-on coating of a high-temperature metallic material, such as manganese-molybdenum or manganese-tungsten or any other suitable material. The metallization pattern for the embodiment illustrated includes the side edges 31 and a narrow strip 32 around the periphery of the upper surface of the slab, as seen in FIG. 2-B; as well as a narrow strip 33 around the periphery of the underside 34 of the slab, as seen in FIG. 2-C. The upper surface of the slab is also provided with a metallized portion 35 extending across the surface to a point at least beyond an intended site 36 for a cathode lead wire connection. The underside 34 of the ceramic slab does not have a metallized portion corresponding to that at 35 on the upper surface.

An opening 38 extends through the ceramic slab at a point corresponding to the intended site of the emergence of the anode lead wire from the case. The spacing between the anode lead opening 38 and the cathode lead connection site 36 is generally a standard distance, depending on the case size, whereby the unit van be incorporated in circuit board structures having a uniformly spaced-apart lead insertion hole pattern. The internal surfaces 40 of the opening 38 are also metallized, best seen by reference to FIG. 2–F along with an edge portion 41 around the rim of the opening 38 the top surface of the ceramic header 30 as well as a similar edge portion 42 around the rim of the opening on the underside 34 of the ceramic header.

The header 29 is placed over the open end 28 of the sleeve 25 so that the peripheral strip portion 33 on the underside 34 of the header rests on the rim of the mouth opening 28 of the sleeve. The metallized portions of the header as well as the sleeve edge may have been earlier provided with a coating of a solder or brazing alloy, and now by the application of heat and pressure, the header is joined to the sleeve to form the unit shown in FIG 2–D.

It is an important aspect of this invention that the header 29 be joined to the sleeve 25 prior to the positioning of the capacitor body therein. In this way the most reliable metal-joining techniques, e.g. high-temperature soldering or brazing, can be used to form the seal between the header and the sleeve without the danger of exposing the heat-sensitive capacitor anode to the high temperatures of such an operation.

In the conventional method for fabricating hermetically sealed capacitors of this type, the capacitor body is first positioned in the container and the header then soldered to the container opening. In view of the proximity of the anode to the soldering zone, it is generally necessary to employ soft solders and low temperatures. For example lead-tin solders of the 60 percent Sn—40 percent Pb type having melting points up to about 190° C. are generally employed since any significant exposure of most capacitor anodes to temperatures above 200° C. can cause damage to the fragile coatings on the capacitor. Since the sealing of the spaces between the header and the sleeve by soldering depends primarily on the drawing by capillary action of the molten solder into the spaces, it would be preferable to utilize soldering temperatures as high as possible to ensure that the solder does not solidify before entering and sealing all possible openings around the periphery of the seal. This cannot safely be done when the header is soldered to a can already containing the anode and so incomplete seals often result. Testing of the sealed anode into the sleeve, e.g. by plugging the opening 38 and then pressurizing the interior of the case to detect leaks, or by using fluorescent dyes; and the seal reworked where necessary to correct a defects. Various types of high-temperature soldering techniques using solders having melting points of 220° C. and above can be used in making the header to sleeve seal. Silver-lead solders having melting points of 380° C. or silver-lead-tin solders having melting points of 300° C. can be used to give the seal the higher strength, corrosion resistance and electrical conductivity resulting from the use of silver. The seal can also be produced by brazing, using, for example silver containing brazing alloys since the only parts which will be exposed to the high temperatures (over 425° C.) of the brazing operation are the metal sleeve and the metallized ceramic header.

It is therefore an important feature of this invention that the header be hermetically sealed to the sleeve before the capacitor is inserted therein, and preferably by a reliable high temperature metal-joining technique such as hard soldering or brazing.

After the header-sleeve seal has been formed as shown in FIG. 2–D, and preferably tested for gastightness, the unit is ready for the next stage of fabrication wherein the anode is inserted into the case. The anode 26, as sown in FIG. 2–E is porous body formed of sintered particles of an anodizable metal, generally tantalum, and having a tantalum anode lead embedded therein or welded thereon projecting as a short stub 27. The porous body has been previously treated by methods known in the art to produce successive layers or coatings thereon, as follows: a dielectric oxide film on the exposed surfaces of the porous tantalum body, a solid electrolyte layer of manganese dioxide over the dielectric oxide, a graphite coating over the electrolyte layer, and a metallized coating, e.g., a silver-plastic paint or a copper coating over the graphite. Often a solder coating will be applied over the metallized coating and it is this outer solder or metallized coating, as the case may be which appears as the outer surface 44 of the anode in FIG. 2–E. Since the tantalum anode lead 27 is not solderable, and since it is generally desired to have a solderable metal lead on these components to enable their easy incorporation into a circuit, a nickel lead wire extension is now welded to the tantalum stub 27. This welding operation is to be performed before the anode 26 is incorporated into the sleeve and a convenient method for welding the nickel lead wire to the anode is shown in FIGS. 2–F and G. As seen in FIG. 2–F, a length of nickel lead wire has been threaded through the opening 38 in the header 29 so that a portion of the lead passes out of the bottom opening 46 of the sleeve 25. This wire is not permanently secured in the metallized opening 38 at this time. Since the component is to be radially leaded, i.e., with the leads spaced each offset an equal distance from the centerline of the unit, the nickel lead wire 45 is provided with an L-shaped bend to form a leg 47. As seen in FIG. 2–G the nickel wire is welded crosswise to the tantalum stub 27 at a point 48 along the leg 47 corresponding to the intended offset of the lead from the centerline of the unit.

The weld of the nickel lead wire 45 to the tantalum stub 27 can be made at a point 48 close to the top 49 of the anode body 26 as the welding equipment will allow. Since the weld is made before the header 29 is attached to the lead wire 45, the weld cite 48 can be positioned in welding equipment arranged above or to the side of the anode body-tantalum stub region. The welded connection can therefore be made at a point 48 quite close to the top 49 of the anode thereby reducing the overall height of the anode body-tantalum stub combination. A smaller sized sleeve can be used to hold the unit and so volumetric efficiency is high. This would not be the case however if the welding of the nickel wire 45 to the anode stub 27 were to be performed after the nickel lead was permanently secured, as is sometimes a required practice in making miniature hermetically sealed capacitors.

The so-leaded capacitor anode 26 is now passed into the open end 46 of the sleeve 25 by pulling the free end of the nickel lead wire 45 above anode lead opening 38 to draw the anode up into the sleeve, as shown in FIG. 2–H. The anode 26 can be positioned with the stub of the tantalum wire 27 as close to, or even abutting the underside of the header 29 as is desired to achieve a minimum sized unit. The lead wire 45 could have been welded to the anode stub 27 on the anode 26 before the wire 45 was passed through the hole 38 in the header 29. However this would then require that the free end of the wire 45 be passed into the open end 46 of the sleeve 25 and then threaded out through the opening 38 in the header 29. This is a difficult operation particularly in regard to the assembly of the miniature sized units. It is therefore generally more convenient to first thread the nickel wires from the top and through the opening 38 into the can and out the bottom opening 46. The wires 45 can be made as long as necessary to allow room for the welding apparatus under the sleeve 25. The important consideration is that the welding be done outside the confines of the sleeve whereby a weld of the nickel lead to the anode stub can be made much closer to the anode. For example in the conventional technique for making these welds where the nickel wire is prebonded to the header, a space of about 0.9 inches must be left between the underside of the header and the top of the anode 49 to give room for the welding equipment. By using the procedures of this invention, a spacing of only 0.05 or so is required between the underside of the header and the top of the anode in the smaller case sizes.

The sleeve with its contained anode is now placed in the cavity 50 of a soldering mold 51 as shown in FIG. 2–J. A heating coil 52, or any other suitable heating means, is used to melt a quantity of solder in the bottom of the mold cavity. The interior of the sleeve as well as the surface of the anode 26 could have been provided with a solder coating. The quantity of solder used is sufficient to raise the level 53 of the solder filling in the can to a point high enough to mechanically secure the anode therein and to provide good electrical contact, but below of the top 49 of the anode so that no short circuit to unprotected areas on the top of the anode or on the lead wires. The solder is allowed to solidify 54 in the case and then the sleeve is removed from the mold. As shown in FIG. 2–K the solder filling 54 seals the bottom opening 46 of the sleeve 25. A lower temperature solder can be used here in solder sealing the base of the sleeve since it is easier to achieve good hermetic seals when soldering large surface areas as are presented by the relatively large sleeve opening, the internal surfaces of the sleeve and the surface of the anode. It is not necessary to use the high-temperature soldering or brazing to get a good seal here as it would be when attempting to make to the more difficult peripheral seal between the header and sleeve.

Additionally by using a soft- or low-temperature solder to seal the opening 46 in the bottom of the sleeve and to secure the anode 26 therein, there is less danger of thermal damage to the heat-sensitive anode, which in this case must be directly contacted by the molten solder. The process of this invention therefore allows the use of the most appropriate fabrication means for performing the two main operations involved in making the hermetic seals: (1) the use of high-temperature soldering or brazing to seal the header to the sleeve, made possible by the absence of the heat-sensitive anode from the sleeve at the time of this operation; and (2) the use of a low-temperature soldering to close the easily soldered bottom opening of the sleeve after the unit is assembled.

The nickel lead 45 could have been sealed in the opening 38 in the header at any time after the anode was pulled into position in the sleeve, as shown in FIG. 2–H. That is, this seal could be made either before or after the solder sealing of the bottom opening 46 of the sleeve 25 in the solder mold 51. In the procedure illustrated in FIG. 2, this sealing of the nickel wire in the opening 38 in the header has been done afterwards, as seen by the presence of the solder fillet 55 bonding the lead wire 45 to the metallized edge portion 41 around the header opening 38 in FIG. 2–K. The solder also fills the space in the opening 38 between the metallized sides 40 thereof and the wire. A high- or low-temperature solder can be used in making this seal since the use of the fillet of solder 55 surrounding the wire as it emerges from the header opening insures that the seal will be adequate.

The cathode lead can be applied by abutting a length of nickel wire 56, preferably solder coated, against the cathode lead site 36 on the metallized portion 35 on the upper surface of the header 29, and soldering it in place leaving a small solder fillet 57. Referring now to FIG. 2–K, the cathode lead 56 makes electrical contact to the cathode of the capacitor, i.e., the outer metallized surface 44 of the anode, through an electrical path consisting of the metallized coatings of the upper surface 35, sides 31, and underside 33 of the header, and then the sleeve 25 and the solder filling 54 which is in electrical contact with the surface 44 of the capacitor. The connection of the cathode lead 56 could have been made at earlier stages in the fabrication of the device. The cathode lead could have been brazed to the metallized portion 35 of the header even before the capacitor anode was inserted into the sleeve.

The metallization pattern on the header may be varied to give whatever arrangement and spacing of leads that is desired. The header shown has a metallized strip 32 extending around the edge of its upper surface. Since the sleeve is bonded only to the strip 33 on the underside of the header, it is not actually necessary to have this upper edge strip 32 except in the vicinity of the metallized portion 36 which must have a continuous metallized path to the strip 33 on the underside of the header, so as to make electrical contact to the sleeve. The upper strip 32 is shown since it is sometimes convenient to apply the metallized materials to the ceramic header blank by pointing or dipping the edges thereof with the result that the metallizing material overlaps the upper and lower surfaces of the header in the form of the strips 32 and 33. The header could also be provided with a metallizing pattern by first metallizing all the surfaces of the header, sintering and then grinding off the unwanted material.

Figure 3:
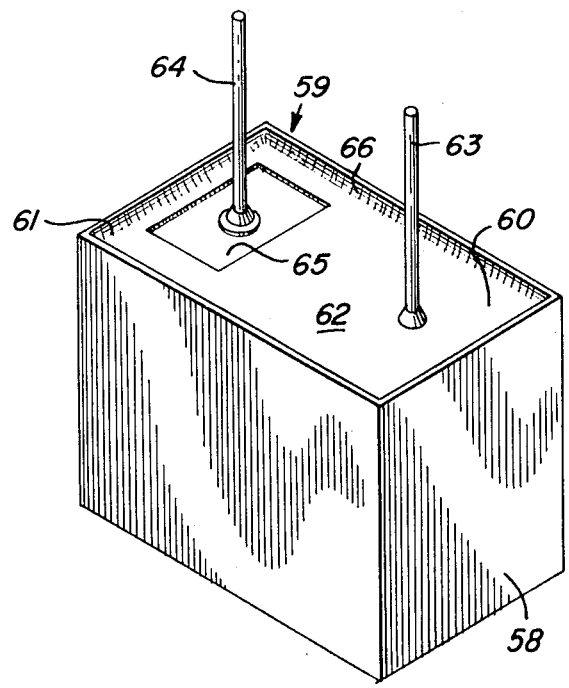
FIG. 3 is a perspective schematic view of another embodiment of a hermetically sealed solid electrolytic capacitor according to this invention.
Figure 4:
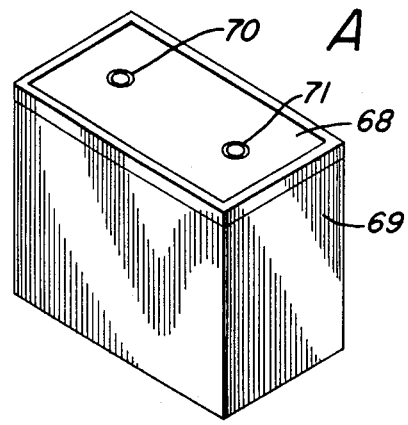
FIGS. 4 A to E are a series of schematic perspective and sectional views showing the steps in fabricating another embodiment of a hermetically sealed solid electrolytic capacitor according to this invention.
Figure 4:
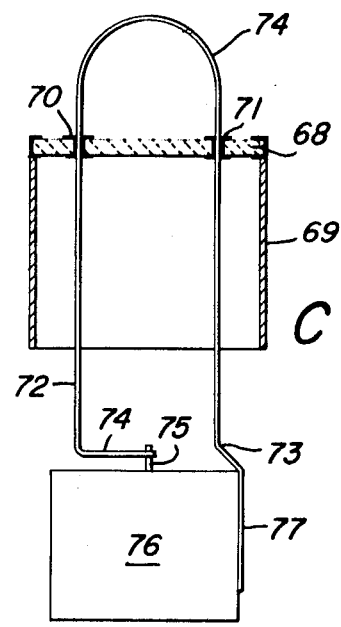
Figure 4:
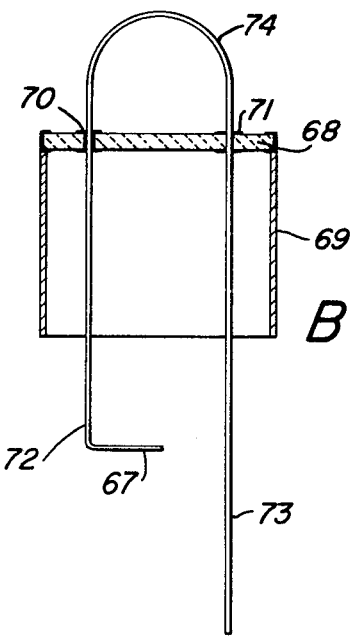
Figure 4:
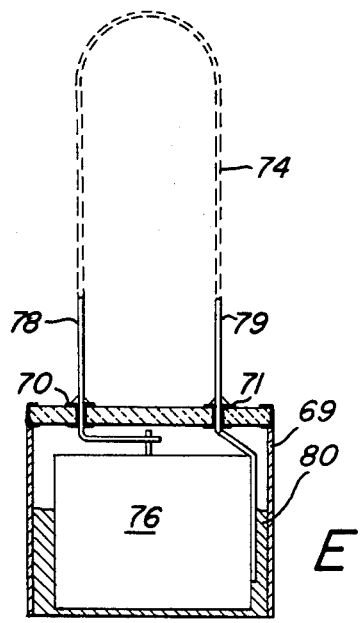
Figure 4:
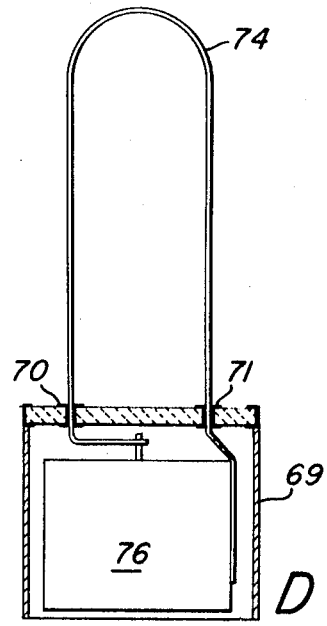

Referring now to FIG. 3, there is shown another embodiment of the invention wherein a hermetically sealed capacitor 59 is shown having a header 60 which was inserted into the top opening in the sleeve 58. This header has a length and width slightly less than the length and width of the sleeve opening The metallization in the upper surface of the header comprises edge strips 61 and metallized portion 62 surrounding the cathode lead 63. The anode lead opening and anode lead 64 are surrounded by an unmetallized portion 65 of the header. The solder fillet 66 is seen to extend around the edge of the header bonding it to the sleeve. The sides of the header are also metallized but it is not necessary to metallize the underside of the header since the electrical path from the cathode lead 63 is directly through the metallized portion 62 and strips 58 to the metal sleeve 61 through the solder fillet 66. In FIGS. 4 A to E the assembly of another embodiment of this invention is shown. As seen in FIG. 4–A, the header 68, already sealed to the sleeve 69, has two metallized openings 70 and 71, respectively for the anode lead and cathode lead. There is no metallization pattern connecting the cathode lead opening metallization to the seal and a separate cathode lead wire is to be passed through the opening 71 and into contact with the metallized surface of the capacitor body. This can be conveniently arranged by threading the legs 72 and 73 of a hairpin-shaped nickel wire 74 through the holes 70 and 71 in the header as seen in FIG. 4–B. The end of leg 72 is appropriately shaped to form the crossbar 67 for welding to the anode stub 75 of a capacitor anode 76; and the end of leg 73 is shaped to form a contact 77 to be soldered to the metallized coating on the anode body 76, as shown in FIG. 4–C. The anode body 76 is then drawn into the open end of sleeve 69 as shown in FIG. 4–D by pulling the wire 74 upwards. The leads are soldered in the opening 70 and 71 as shown in FIG. 4–E and the bent portion 74 of the wire is severed to form the anode and cathode leads 78 and 79. The bottom opening of the capacitor is sealed with solder 80 as previously described. It is not essential that a hairpin-shaped wire be used to form the anode and cathode leads, and separate wires could have been first secured to the capacitor and then threaded through the openings in the header. It is only necessary that the header be first sealed to the sleeve before the capacitor body is positioned in the sleeve.

Figure 5:
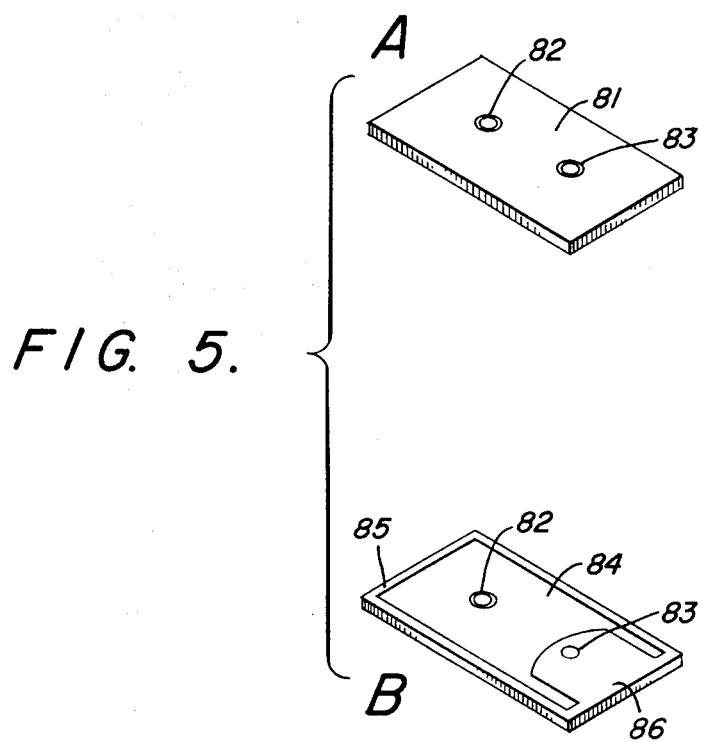
FIGS. 5 A and B are schematic perspective views of the top and bottom of another embodiment of a header used in a hermetically sealed solid electrolytic capacitor of this invention.
Figure 6:
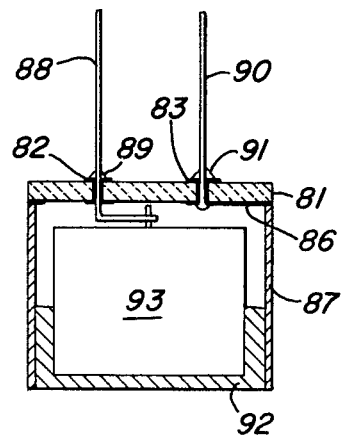
FIG. 6 is a sectional view of a hermetically sealed solid electrolytic capacitor utilizing the header design of FIG. 5.

In FIGS. 5 and 6 there is shown an arrangement for providing a radially leaded device wherein the cathode lead is securely fastened to the header by being secured in an opening therein but where the cathode lead does not further enter the case. In FIG. 5–A showing the upper surface of the header 81, it is seen that there are two metallized openings 82 and 83. In FIG. 5–B, showing the underside 84 of the header, there is shown a metallized strip 85 and a metallized portion 86 extending from the metallized opening 83 to the strip 85. Referring now to FIG. 6 the header 81 is shown sealed to the open end of the sleeve 87 and the capacitor anode lead 88 is shown extending through opening 82 and soldered by solder fillet 89 therein. The cathode lead consists of a nickel wire 90 which was soldered 91 in the opening 83. The cathode lead is electrically connected to the capacitor 93 through the path formed through the metallized portion 86 surrounding the opening 83 to the sleeve 87 and hence to the solder filling 92 around the capacitor 93. This type of cathode lead attachment has the advantage of being more securely fastened than the case where the end of the cathode wire is merely abutted against a metallized surface on the upper part of the header and soldered thereto.

The fabrication procedures disclosed herein can be used with advantage in the production of radially leaded solid electrolytic capacitors of any size, but they are particularly suited for the production of miniature devices. Table 1 shows the cases sizes of a series of such miniature hermetically sealed solid electrolytic capacitors. These capacitors can be made with a broad range of values, e.g. from a capacitance of about 0.0047 $\mu$ F. at 10 volts to about 200 $\mu$ F. at 3 volts, depending on the case size. The length "L" and width "W" of the rectangular cases are as shown in FIG. 2 A. The height "$h$" refers to the overall height of the case including the header but excluding the lead wires.

In the table, the capacitor series 1 through 5 were all constructed according to the present invention. Capacitor 6 in the table represents a commercially available hermetically sealed radially leaded capacitor constructed according to the prior art techniques described earlier, i.e., where the nickel lead wire is soldered in place in the header before the anode lead wire is welded to this nickel wire and where the header-anode assembly is then placed in a solder-containing cup-shaped can and heated to melt the solder while the header-can seal is formed.

The Volumetric Efficiencies of the listed capacitors were determined according to the following formula:

Volumetric Efficiency = (Capacitance × Voltage)/Volume
and is given in the units $\mu$ F.-V./cubic inch. As shown in the table the prior art capacitor had a Volumetric Efficiency of only 17.1 while the comparable capacitors made according to the present invention (capacitor series 4 and 5) had Volumetric Efficiencies of 32.5 to 35.0, indicating a significant improvement. The capacitors designated 1 to 3 are of a much smaller size and represent microminiature size capacitors. While the Volumetric Efficiencies of these devices is not as high as that of the larger devices, they still are excellent for the size of the units.

forming an electrical connection between the metallized surface of said capacitor and the sleeve, a first solderable metal lead wire extending through the metallized opening in the header and hermetically sealed therein, the end of said lead wire in the sleeve being welded to anode lead of the capacitor and the free end of the wire above the header providing as the external anode lead of the capacitor, a second solderable metal wire bonded to the header, at a point spaced apart from the first wire and said peripheral portion thereof serving as the cathode lead of the capacitor, and an electrical connection between said cathode lead wire and the metallized surface of the capacitor body.

2. The article of claim 1 wherein the header comprises a metallized portion extending between its metallized peripheral portion and the point where the cathode lead wire is bonded to the header whereby an electrical path is formed by said metallized portion through the metallized peripheral portion of the header to the sleeve and through the solder body therein to the metallized surface of the capacitor body.

3. The article of claim 1 wherein the header comprises two spaced-apart openings insulated from each other and each having metallized interiors and overlapping rim portions on the surface of the header, and wherein the solderable metal anode lead wire extends through and is bonded in one of the openings, and the solderable metal cathode lead wire extends through the other of said openings and is bonded therein, the end of said cathode lead wire in the sleeve being soldered to the metallized surface on the capacitor body.

4. The article of claim 1 in which the header comprises two spaced-apart openings, the first of said openings having a metallized interior and overlapping rim portion therearound the second of said openings having a metallized interior and an overlapping metallized portion on the underside of the header extending to the metallized peripheral portion thereof, the solderable metal anode lead wire extending through the first of said openings and bonded therein, and the solderable metal cathode lead extending into and terminating within the second opening and bonded to the metallized portion on the underside of the header.

5. The article of claim 1 in which the peripheral seal between the header and the sleeve is a high-temperature containing silver solder seal.

6. The article of claim 1 in which the peripheral seal

TABLE 1.—COMPARISON OF VOLUMETRIC EFFICIENCIES

| Capacitor designation | Case size in inches | | | Range of capacitance in $\mu$f. | Range of voltage, rating in volts | Volumetric efficiency in $\mu$f.-v./cu. in. ×10⁻³ |
|---|---|---|---|---|---|---|
| | W | L | H | | | |
| Capacitor construction: | | | | | | |
| According to the present invention { | 1 | 0.070 | 0.120 | .165 | 0.0047 to 10.. 35 to 2 | 14.4 |
| | 2 | 0.075 | 0.185 | .225 | 0.68 to 22.... 35 to 2 | 30.0 |
| | 3 | 0.110 | 0.220 | .290 | 2.2 to 47..... 35 to 4 | 28.5 |
| | 4 | 0.130 | 0.2 0 | .310 | 6.8 to 68..... 35 to 4 | 32.5 |
| | 5 | 0.150 | 0.375 | .475 | 10 to 220.... 35 to 3 | 35.0 |
| According to the prior art | 6 | 0.170 | 0.360 | 0.385 | 27............ 15 | 17.1 |

We claim:

1. An hermetically sealed capacitor comprising an open-ended metal sleeve, a header composed of an insulative material and having a metallized portion around its periphery and at least one metallized opening extending therethrough, said header closing one open end of the sleeve and bonded thereto in a peripheral hermetic seal between the metallized peripheral portion and the end of the sleeve, a solid electrolytic capacitor body having an anode lead connected thereto and a metallized surface thereon, said body positioned in said sleeve with the anode lead proximate the underside of the header, a body of solder sealing the other end of said sleeve and securing the capacitor body within the sleeve and between the header and the sleeve is a brazed seal.

7. The article of claim 1 in which the capacitor body is a porous mass of pressed and sintered tantalum particles and the anode lead is a tantalum wire, and wherein said porous mass has a dielectric oxide film over its surfaces, a solid electrolyte layer thereon, a graphite layer over the electrolyte and a metallized layer over the graphite.

8. The article of claim 1 in which the solderable metal lead wires are nickel.

9. The article of claim 1 in which solderable metal wires are bonded to the header by high-temperature silver-containing solders.

10. The article of claim 1 in which the header is composed of alumina.